United States Patent
Kropp

(10) Patent No.: US 6,574,390 B2
(45) Date of Patent: Jun. 3, 2003

(54) CONFIGURATION TO MULTIPLEX AND/OR DEMULTIPLEX THE SIGNALS OF A PLURALITY OF OPTICAL DATA CHANNELS AND METHOD FOR THE PRODUCTION OF THE CONFIGURATION

(75) Inventor: Jörg-Reinhardt Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/784,767

(22) Filed: Feb. 15, 2001

(65) Prior Publication Data

US 2002/0110316 A1 Aug. 15, 2002

(51) Int. Cl.[7] ............... G02B 6/28; G02B 6/26; G02B 6/10
(52) U.S. Cl. ............ 385/24; 385/18; 385/129; 385/130
(58) Field of Search ............. 385/18, 24, 129, 385/130; 359/115, 117, 124, 127, 128

(56) References Cited

U.S. PATENT DOCUMENTS

| | | | | |
|---|---|---|---|---|
| 4,740,951 A | * | 4/1988 | Lizet et al. ............ | 359/130 |
| 5,263,111 A | * | 11/1993 | Nurse et al. ........... | 385/130 |
| 5,299,570 A | * | 4/1994 | Hatschek ............... | 356/41 |
| 5,448,586 A | * | 9/1995 | Shmulovich et al. ... | 359/343 |
| 5,940,568 A | * | 8/1999 | Losch .................... | 385/129 |
| 6,108,463 A | * | 8/2000 | Herron et al. .......... | 385/12 |
| 6,215,928 B1 | * | 4/2001 | Friesem et al. ........ | 372/102 |
| 6,271,945 B1 | * | 8/2001 | Terahara ................ | 359/124 |
| 6,321,001 B1 | * | 11/2001 | Heflinger ............... | 385/24 |
| 6,356,679 B1 | * | 3/2002 | Kapany ................. | 385/18 |

FOREIGN PATENT DOCUMENTS

| | | |
|---|---|---|
| EP | 0 887 674 A2 | 12/1988 |
| EP | 0 844 503 A1 | 5/1998 |
| EP | 0 877 264 A2 | 11/1998 |
| EP | 1 004 907 A2 | 5/2000 |

* cited by examiner

Primary Examiner—Evelyn Lester
Assistant Examiner—Jack Dinh
(74) Attorney, Agent, or Firm—Laurence A. Greenberg; Werner H. Stemer; Ralph E. Locher

(57) ABSTRACT

The invention relates to an arrangement for multiplexing and/or demultiplexing the signals of a plurality of optical data channels of different wavelength, in which the multiplexed signals are transmitted in a waveguide (1). According to the invention, the waveguide (1) is disposed or embodied in a planar substrate (2), which has a plurality of cutouts (3) extending at a defined angle, which interrupt the waveguide (1) at successive points, and one wavelength-selective mirror (4) is disposed in each of these cutouts (3), at which mirror light is coupled in or out obliquely to the surface of the substrate (2). The invention further relates to a method for producing such an arrangement.

22 Claims, 2 Drawing Sheets

CONFIGURATION TO MULTIPLEX AND/OR DEMULTIPLEX THE SIGNALS OF A PLURALITY OF OPTICAL DATA CHANNELS AND METHOD FOR THE PRODUCTION OF THE CONFIGURATION

BACKGROUND OF THE INVENTION

Field of the Invention

The invention relates to an arrangement for multiplexing and/or demultiplexing the signals of a plurality of optical data channels of different wavelengths that are transmitted in a waveguide.

In optical communications technology, for transmitting the greatest possible quantity of data via an optical waveguide, it is known to multiplex the data to be transmitted. One way of doing this is to transmit information at multiple wavelengths independently and simultaneously over one waveguide. To this end, it is necessary on the transmission side for the signals of the various light sources to be united by an optical multiplexer in an optical waveguide, and on the receiver side for the signals at various wavelengths from the arriving waveguide to be split up by an optical demultiplexer into individual data channels for separate detection.

One way of achieving multiplexing or demultiplexing is to separate the wavelengths of the various data channels using interference filters. Especially at relatively great wavelength spacings between the individual data channels of 10 nm and more, this proves to be quite effective. By means of a high number of interference layers at the individual interference filters, very steep spectral edges between transmission and reflection of various wavelengths can be created. By cascading such filters with individually different spectral transmission and reflection layers, a selection or unification of many wavelength channels can be accomplished. The use of interference filters for achieving multiplexing or demultiplexing is described for instance in European Patent Disclosures EP-A-0 877 264 and EP-A-1 004 907.

In EP-A-0 877 264, the cascading of the filters is done in a parallel optical beam path, which disadvantageously requires beam shaping by means of lenses or mirrors. In EP-A-1 004 907, the use of a divergent beam is described. However, these divergent beams are assigned focusing mirrors, so that once again beam shaping by mirrors is required.

Another possible way of cascading the filters is to guide the light in waveguides. Arrangements are known in which the light guided in a waveguide is reflected at an angle at a mirror surface designed to be wavelength-selective and is carried onward after the reflection in a further waveguide. The requisite cascading can be done with zigzag guidance of the waveguides between a plurality of mirrors.

SUMMARY OF THE INVENTION

The object of the present invention is to furnish an arrangement for multiplexing and/or demultiplexing the signals of a plurality of optical data channels that makes it possible in a simple way to achieve multiplexing and demultiplexing of various wavelengths guided in one waveguide. A method for producing such an arrangement is also to be furnished.

Accordingly, the arrangement according to the invention for multiplexing and/or demultiplexing is distinguished in that the waveguide is disposed or embodied in a planar substrate that has a plurality of cutouts extending at a defined angle that interrupt the waveguide at successive points. One wavelength-selective mirror is disposed in each of the cutouts, and at each mirror light is coupled in or out obliquely to the surface of the substrate.

Thus according to the invention, incoupling and outcoupling of light is done in a plane that is at an angle to the plane of the substrate in which the waveguide is disposed. The invention makes it possible to realize the assembly in a simple way, since all that needs to be done is to make lateral cutouts into the substrate at a defined angle from the substrate edge using a wafer saw and then to place the wavelength-selective filters in these cutouts.

In a preferred feature of the invention, all the cutouts have the same angle relative to the substrate surface. This makes simple production of the arrangement possible by sawing or etching the substrate, always at the same angle. In principle, however, the various cutouts can also have different angles.

The angle of the cutouts or wavelength-selective mirrors to the substrate surface is 30, for example, but can be varied over a relatively wide range. Care must merely be taken that the wavelength-selective layers of the mirror, at the angle of incidence set, furnish a steep spectral edge between transmission and reflection of the various wavelengths, so that the individual channels can be cleanly separated from one another or joined together.

The various mirrors are preferably positioned in the various cutouts by way of an adhesive, and the adhesive preferably has a similar or identical coefficient of diffraction to the waveguide of the substrate. It should be noted that by interrupting the waveguide at the cutouts, irregularities can occur at the waveguide. In particular, the end faces of the waveguide are not polished at the interruption points. By using an adhesive that has a similar coefficient of diffraction to the waveguide, irregularities that have formed at the end faces of the waveguide where it has been cut apart are filled up and optically balanced again.

The waveguide used is preferably an optically integrated waveguide. However, it is also within the scope of the invention to use a fiber, in particular glass fiber, as a waveguide that is placed in a suitable indentation in the substrate and secured therein. As examples of materials for the waveguide, glass and plastic can be named. It is also possible to form the waveguide of a semiconductor material; in that case, the waveguide is embodied as optically integrated.

In a preferred feature, especially when the arrangement is used as a receiver or in other words as a demultiplexer, the waveguide disposed in the substrate is embodied as a many-mode waveguide. As a result, the arrangement can be used both in systems with single-mode fibers and in systems with multi-mode fibers.

Multi-mode waveguides have the property that radiation is guided in different directions in the waveguide. This leads to a widening of the spectral admission curve of the interference filters. To counteract this tendency, one advantageous feature of the invention provides using semiconductor materials for the filters or wavelength-selective mirrors. Semiconductor materials have a very high coefficient of diffraction, as a result of which the angular dependency of the filter curve of interference filters can be reduced markedly. Another advantage of using semiconductor materials as filters is that such filters can be produced with very high precision, for instance epitaxially, and by way of example as a material system of GaAs-AlAs. The high coefficient of diffraction of semiconductor materials also lessens the widening of the beam on passing through the filter substrate, which minimizes optical losses upon passage through the filter.

In further preferred feature of the invention, the light coupled in or out via a wavelength-selective mirror is coupled with a respective transmitter or receiver unit which is disposed directly on the substrate. The substrate thus serves additionally for mounting the transmitter or receiver units. By mounting the transmitter or receiver units directly above the radiation exit or entrance region of the surface of the substrate, good optical coupling is assured. The electrical bonding of the transmitter or receiver units is done via a conductor track structure on the substrate, which can be disposed thereon in a manner known per se.

In a preferred refinement of the invention, guide structures for attaching optical waveguides are integrated with the substrate. If silicon is used as the substrate, then the structures can be created with high precision, for instance by anisotropic etching. The provision of such guide structures enables adjustment-free attachment of the multiplexing/demultiplexing assembly to the light-carrying fibers.

In a preferred feature, the waveguide extends near the edge of the substrate. As a result, the lateral cutouts in the substrate can be embodied as relatively short and can be made simply.

In addition to an embodiment of the substrate of silicon, an embodiment of the substrate by plastic is also conceivable in particular. For producing a waveguide in the plastic substrate, the substrate is provided, for instance by embossing, with channel-like structures that are then filled with waveguide material.

The method of the invention for producing a multiplexer/demultiplexer arrangement provides that at a defined angle, cutouts are made into the planar substrate and then wavelength-selective mirrors are placed in these cutouts; the cutouts and wavelength-selective mirrors cut apart the wavelength guide into a plurality of points located one after the other. Fastening of the mirrors in the cutouts is preferably done by means of an adhesive.

In one feature of the method, the cutouts are made in the substrate by sawing using a wafer saw. Since the sawn face has a certain roughness, it is preferably provided that the sawn face be chemically smoothed or etched, for instance using a polish. This has a smoothing effect, which also smooths the end face of the interrupted waveguide.

However, the cutouts can also be made in other ways in the substrate. For instance, in a further feature of the method, the cutouts are made in the substrate by etching in an oblique direction. The advantage of using an etching process is that smooth side walls are automatically present in the cutout.

The method of the invention makes it possible in a simple way to achieve a multiplexer/demultiplexer arrangement.

DESCRIPTION OF THE PREFERRED EMBODIMENT

Figure 1:
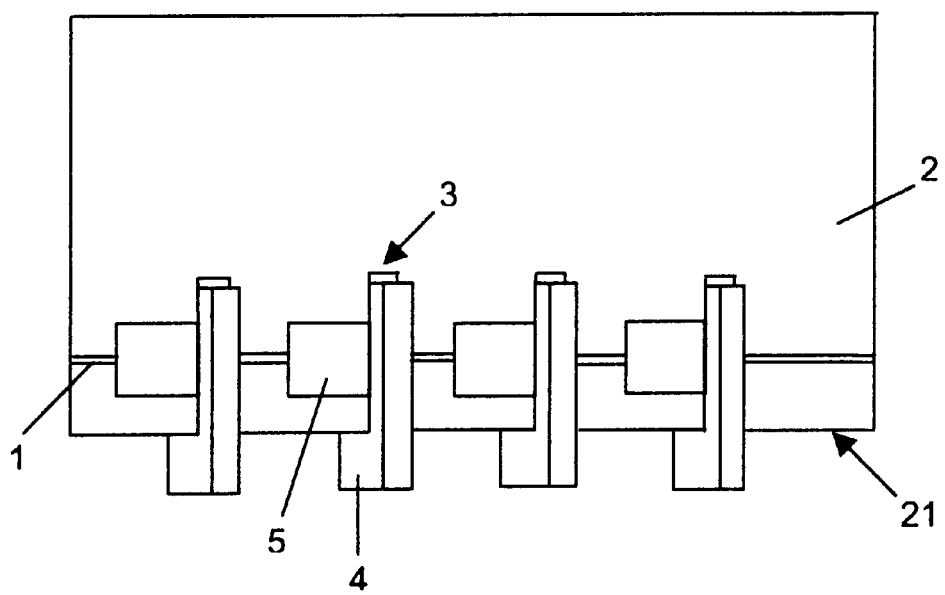
FIG. 1, a plan view on a schematically shown arrangement according to the invention for multiplexing and/or demultiplexing.
Figure 2:
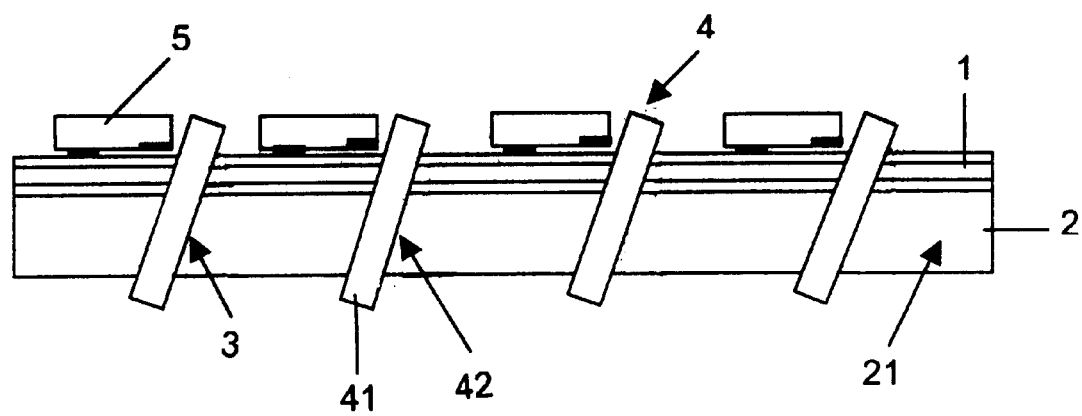
FIG. 2, a side view of the arrangement of FIG. 1.

In FIGS. 1 and 2, in plan view and side view, respectively, an arrangement according to the invention for multiplexing and demultiplexing optical signals is shown schematically. A waveguide 1 extends parallel and in adjacent spacing to the edge 21 of a substrate 2. The substrate 2 is silicon or lithium niobate, for instance. A plastic can also be used as the substrate; then the waveguide material is placed in surface structures of the plastic.

The optical waveguide 1 is either embodied as optically integrated or comprises an optical fiber that is placed in a suitable elongated recess on the surface of the substrate and fastened therein in a defined way. In an integrated optical embodiment, the optical waveguide for instance comprises a titanium strip that is diffused into a substrate of lithium niobate. If an optical fiber is used, it is preferably of glass, but can also be formed by a polymer, for instance.

The waveguide 1 can also be embodied as a many-mode waveguide, so that it can be used both in systems with single-mode fibers and in systems with multi-mode fibers.

As seen particular from the side view in FIG. 2, many lateral cutouts 3 are made into the substrate 2, which extend from the edge 21 perpendicular to the longitudinal direction of the waveguide 1. The lateral cutouts are made for instance by means of a wafer saw or by etching at an oblique angle. It is essential that the cutouts extend at an angle other than 90 to the surface of the substrate 2.

In FIGS. 1 and 2, the cutouts have the same angle relative to the substrate surface. However, it is also possible to provide different angles for the various cutouts.

One wave-selectively reflecting mirror 4 is placed in each of the individual cutouts 3 and represents a filter for a particular spectral range. Each mirror 4 comprises a carrier 41 and a filter chip 42 with wavelength-selective interference layers, which is embodied on one surface of the carrier 41.

The cutouts 3 and the mirrors 4 disposed on them each interrupt the waveguide 1. Especially when the cutouts 3 are made using a wafer saw, the waveguide has irregularities at the end faces of the waveguide formed where it is cut through. To eliminate these irregularities or minimize their effect, the wavelength-selective mirrors 4 are preferably secured in the cutouts 3 by means of an adhesive that has a similar coefficient of diffraction to the waveguide 1. If a glass fiber is used as the waveguide 1, the adhesive thus has a coefficient of diffraction of about n=1.5. As a result, the aforementioned irregularities can be filled up and optically balanced. To reduce the irregularities of the end faces, it can also be provided that these faces be smoothed chemically.

The carrier 41 of the mirror 4, in one feature of the invention, comprises a semiconductor material. Semiconductor materials are distinguished by having a coefficient of diffraction. The effect of this is that light emerging from the unpolished end face of the waveguide 1, which is by nature divergent in the region upstream of where it is coupled into the mirror 4, is diffracted more markedly because of the elevated coefficient of diffraction of the carrier 41. This lessens any widening of the beam. A disadvantage of the use of a carrier 41 with a high coefficient of diffraction, however, is a beam offset in the waveguide 1 that is intrinsic to the difference in coefficient of diffraction.

However, it can also be provided that the carrier 41 of the filter 4 has essentially the same coefficient of diffraction as the optical waveguide 1. This has the advantage of not causing any beam offset upon passage through the carrier 41. If a semiconductor material is used for the carrier 41, an offset can be avoided or reduced by providing that the waveguide likewise comprises semiconductor material.

If light signals from many data channels at different wavelengths are transmitted through the waveguide 1 (incoupling from the left-hand plane of the drawing), then at each wavelength-selective filter or mirror 4 a reflection of a certain wavelength, which is typical for the applicable mirror and represents a data channel, and a transmission of the other wavelengths occurs. Because of the angular disposition of the mirrors 4 relative to the waveguide 1, light reflected from the applicable mirrors 4 from a certain channel is broadcast obliquely to the surface of the substrate 2 and out-coupled or—if the spreading direction of the light is the reverse—in-coupled. The remainder of the light shines through the respective filter chip 42 and is carried on in the waveguide 1 extending onward downstream of it.

By cascading of the filters, multiplexing and demultiplexing of the optical signals of a plurality of wavelengths or data channels is achieved.

The light reflected at the various filters is coupled directly into a receiver unit 5 known per se, which in the embodiment shown is mounted directly above the exit region of the radiation on the surface of the substrate 2. The unit 5 can also be embodied as a transmitter unit, in which case light signals are then coupled into the waveguide 1 via the mirrors 4. The optically active area of the transmitter or receiver element is 10 to 20 m, for instance.

Figure 3:
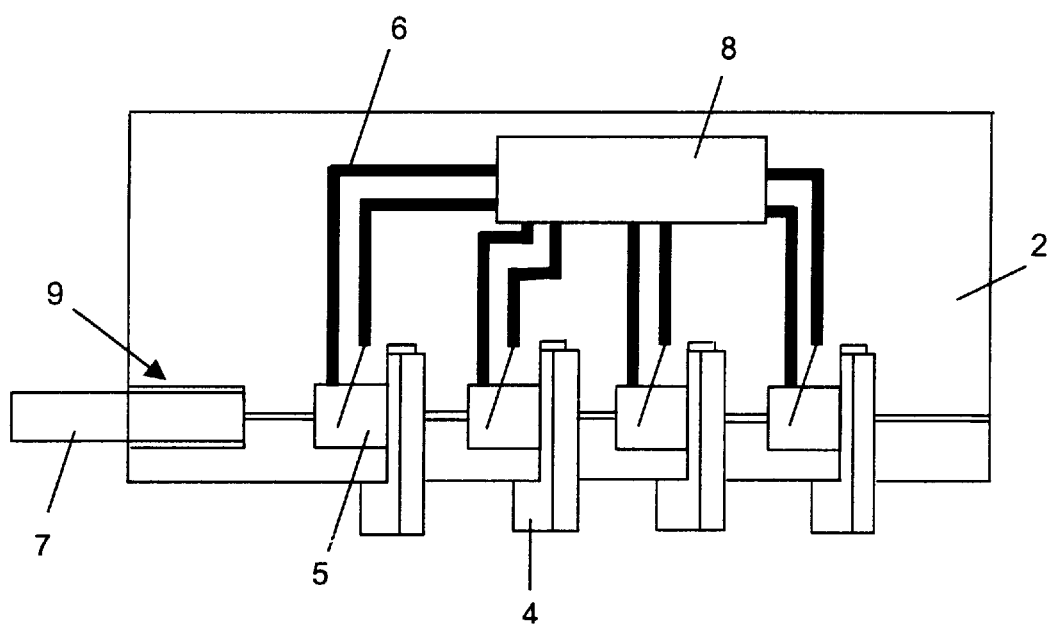
FIG. 3, an exemplary embodiment of the arrangement according to the invention of FIG. 1, in which the electrical bonding of the transmitter or receiver units and guide structures for attaching an optical waveguide are shown in addition.

In FIG. 3, for the electrical bonding of the transmitter or receiver units 5, it is provided that a conductor track structure 6 known per se be made on the substrate 2.

It can also be seen from FIG. 3 that at the edge of the substrate 2, a guide structure 9 for receiving or placement of an optical waveguide 7 is embodied integrally. This structure in the exemplary embodiment shown is a V groove 9, which if silicon is used as the substrate 2 is preferably produced with high precision by anisotropic etching and has a depth such that the attached optical waveguide 7 is located at the same height as the waveguide 1 of the substrate, so that without further adjustment, low-loss light coupling is furnished between the waveguide 7 brought there and the waveguide 1 of the substrate 2.

FIG. 3 also schematically shows an amplifier 8, by way of which the signals of the various transmitter or receiver units 5 are preamplified or generated.

The invention is not limited in its embodiment to the exemplary embodiments described above. All that is essential for the invention is that multiplexing or demultiplexing is realized by providing that a substrate has a plurality of cutouts extending at a defined angle, which interrupt a waveguide at successive points, and one wavelength-selective mirror is placed in each of these cutouts. Such an arrangement in a simple and effective way enables multiplexing and demultiplexing of signals that extend within a planar waveguide.

I claim:

1. A configuration for multiplexing and/or demultiplexing signals of a plurality of optical data channels of different wavelength, the configuration comprising:

a waveguide for transmitting the signals;

a plurality of wavelength-selective mirrors; and a planar substrate having a planar surface and an edge and being formed with a plurality of cutouts each extending at a defined angle, said defined angle being different than 90° with respect to said planar surface;

said waveguide disposed in said substrate, said plurality of said cutouts interrupting said waveguide at successive points;

a respective one of said plurality of said wavelength-selective mirrors disposed in each one of said plurality of said cutouts causing mirror light to be coupled obliquely to said planar surface of said substrate and to pass through said planar surface.

2. The configuration according to claim 1, wherein each one of said plurality of said cutouts has a common angle relative to said planar surface of said substrate.

3. The configuration according to claim 1, comprising:

an adhesive having a coefficient of diffraction, said adhesive positioning said plurality of said mirrors in said plurality of said cutouts;

said waveguide having at least a similar coefficient of diffraction as said coefficient of diffraction of said adhesive.

4. The configuration according to claim 3, wherein said coefficient of diffraction of said waveguide is the same as said coefficient of diffraction of said adhesive.

5. The configuration according to claim 1, wherein said waveguide is embodied in a form selected from the group consisting of an optically integrated waveguide and a fiber.

6. The configuration according to claim 1, wherein said waveguide is formed from a material selected from the group consisting of a glass and a plastic.

7. The configuration according to claim 1, wherein said waveguide includes semiconductor material.

8. The configuration according to claim 1, wherein said waveguide is a multi-mode waveguide.

9. The configuration according to claim 1, wherein said plurality of said wavelength-selective mirrors are semiconductor materials.

10. The configuration according to claim 1, comprising:

a unit selected from the group consisting of a transmitter unit for coupling light into said waveguide using said plurality of said mirrors and a receiver unit for coupling light out of said waveguide using said plurality of said mirrors;

said unit disposed directly on said planar surface of said planar substrate.

11. The configuration according to claim 1, comprising guide structures integrated into said substrate, said guide structures for attaching further optical waveguides.

12. The configuration according to claim 1, wherein said guide structures are anisotropically etched guide structures.

13. The configuration according to claim 1, wherein said waveguide extends adjacent said edge.

14. The configuration according to claim 1, wherein said substrate is silicon.

15. The configuration according to claim 1, wherein said substrate is plastic.

16. A method for producing a configuration for multiplexing and/or demultiplexing signals of a plurality of optical data channels of different wavelength, the method which comprises:

providing a waveguide for transmitting the signals;

providing a plurality of wavelength-selective mirrors;

providing a planar substrate having a planar surface;

placing the waveguide in the substrate;

forming a plurality of cutouts in the substrate, the plurality of cutouts extending at a defined angle other than 90° relative to the planar surface of the substrate; placing the plurality of the wavelength-selective mirrors in the cutouts causing mirror light to be coupled obliquely to the planar surface of the substrate and to pass through the planar surface; and cutting apart the waveguide at a plurality of successive points.

17. The method according to claim 16, which comprises using an adhesive to position the plurality of the wavelength-selective mirrors in the cutouts.

18. The method according to claim 16, which comprises forming the plurality of the cutouts as lateral cutouts.

19. The method according to claim 16, which comprises using a wafer saw to form the plurality of the cutouts.

20. The method according to claim 16, which comprises chemically smoothing surfaces of the plurality of the cutouts.

21. The method according to claim 16, which comprises forming the plurality of the cutouts by etching the substrate.

22. A configuration for multiplexing and/or demultiplexing signals of a plurality of optical data channels of different wavelength, the configuration comprising:

an optically integrated waveguide for transmitting the signals;

a plurality of wavelength-selective mirrors; and a planar substrate having a planar surface and an edge and being formed with a plurality of cutouts each extending at a defined angle, said defined angle being different than 90° with respect to said planar surface;

said waveguide disposed in said substrate, said plurality of said cutouts interrupting said waveguide at successive points;

a respective one of said plurality of said wavelength-selective mirrors disposed in each one of said plurality of said cutouts causing mirror light to be coupled obliquely to said planar surface of said substrate and to pass through said planar surface.

* * * * *